US008045972B2

(12) United States Patent  
Ferzali et al.

(10) Patent No.: US 8,045,972 B2  
(45) Date of Patent: Oct. 25, 2011

(54) MULTIMODE WIRELESS RADIO ACCESS NETWORK WITH DISTRIBUTED PROCESSING

(75) Inventors: Wassim A. Ferzali, Burlington, MA (US); Xiao Zhou Liu, North Chelmsford, MA (US)

(73) Assignee: Mayflower Communications Company, Inc., Burlington, MA (US)

( * ) Notice: Subject to any disclaimer, the term of this patent is extended or adjusted under 35 U.S.C. 154(b) by 1344 days.

(21) Appl. No.: 11/219,013

(22) Filed: Sep. 3, 2005

(65) Prior Publication Data

US 2007/0054684 A1    Mar. 8, 2007

(51) Int. Cl.
*H04W 1/00*    (2006.01)
*H04W 4/00*    (2009.01)

(52) U.S. Cl. .............. 455/422.1; 455/552.1; 370/338

(58) Field of Classification Search .......... 455/422.1, 455/552.1; 370/338
See application file for complete search history.

(56) References Cited

U.S. PATENT DOCUMENTS

| 6,181,686 | B1 * | 1/2001 | Hamalainen et al. ........ 370/347 |
| 6,647,426 | B2 | 11/2003 | Mohammed |
| 2003/0119550 | A1 * | 6/2003 | Rinne et al. ................. 455/553 |
| 2003/0185202 | A1 * | 10/2003 | Maenpaa ...................... 370/352 |
| 2003/0214925 | A1 * | 11/2003 | Diaz Cervera et al. ....... 370/335 |
| 2004/0002332 | A1 * | 1/2004 | Noma ......................... 455/428 |
| 2004/0114553 | A1 | 6/2004 | Jiang et al. |
| 2004/0139201 | A1 | 7/2004 | Chaudhary et al. |
| 2004/0162079 | A1 * | 8/2004 | Koshino et al. ............. 455/445 |
| 2004/0203785 | A1 * | 10/2004 | Sundquist et al. .......... 455/436 |
| 2004/0218575 | A1 | 11/2004 | Ibe et al. |
| 2005/0025164 | A1 | 2/2005 | Kavanagh et al. |
| 2005/0026616 | A1 * | 2/2005 | Cavalli et al. ............... 455/436 |
| 2006/0133414 | A1 * | 6/2006 | Luoma et al. ............... 370/466 |
| 2006/0221912 | A1 * | 10/2006 | Olivier et al. ............... 370/338 |

OTHER PUBLICATIONS

3GPP TR 22.934, "Feasibility Study on 3GPP System to Wireless Local Area Network (WLAN) Interworking." Introduction p. 5; Sec 5.1 Scenarios 3-6, p. 16, Sep. 2003.
R. Samarasinghe et al, "Analysis of Intersystem Handover UMTS: FDD & WLAN," Center for Telecommunications Research, King's College, London; Section 2.
3GPP TSG-RAN WG3 Meeting No. 36, "Proposed Architecture for UTRAN Evolution," May 19-23, 2003, Document No. R3-030678; All pages.

* cited by examiner

*Primary Examiner* — Marisol Figueroa
(74) *Attorney, Agent, or Firm* — Kaplesh Kumar

(57) ABSTRACT

A multimode Radio Access Network (RAN) for wireless communication is disclosed. The RAN separates the control signals from the data streams for their distributed processing. The control signals are transmitted between base stations and a Radio Resource Server (RRS), while the data streams are communicated between the base stations and Wireless Access Gateways (WAGs). The base station and WAG resources are managed by the RRS. Besides providing single and multiple radio mode access to a mobile user for efficient communication with other wireless communication networks, the RAN infrastructure has a high outage tolerance and can be scaled cost effectively for wider coverage and increased data traffic capacity.

53 Claims, 5 Drawing Sheets

MULTIMODE WIRELESS RADIO ACCESS NETWORK WITH DISTRIBUTED PROCESSING

The U.S. Government has a paid-up license in this invention and the right in limited circumstances to require the patent owner to license others on reasonable terms as provided for by the terms of contract No. F04611-03-C-0030 awarded by the U.S. Air Force.

BACKGROUND OF THE INVENTION

The instant invention relates to a multimode wireless radio access network (RAN) having a distributed signal processing architecture, which can either be part of a wireless service provider's network or comprise an independent enterprise wireless network infrastructure.

Current and envisioned wireless cellular systems employ various air interfaces between the mobile user communication equipment (UE) and the fixed infrastructure of the Public Land Mobile Network (PLMN). Examples of widely deployed air interfaces, commonly labeled as second generation (2G) networks, include IS-95 (CDMA), IS-136 (TDMA), and GSM. Examples of third generation (3G) wireless networks, more advanced than the 2G networks and in the process of standardization or deployment, include UMTS (WCDMA) and CDMA2000.

The 2G and 3G network architectures consist of two major sub-networks: (a) the radio access network (RAN), and (b) the Core Network (CN). The RAN controls the radio physical aspects of the UE, and the CN controls the UE's access to applications supported by the wireless service provider or external public or private networks, such as the Internet. The wireless service providers typically own and operate both the RAN and CN sub-networks. The traditional wireless network architecture includes the UE, RAN, CN, and the wireless interfaces to network applications.

The traditional RAN has two major components, the radio base station (BS) and the base station controller (BSC). The single-mode RAN of the prior art comprises a multitude of BS/BSC associations depending on the system capacity and coverage area Each BSC controls a cluster of BS's dedicated to the same specific single radio access mode.

The UE employs two levels of signaling protocols for establishing the service connection with a wireless communication network: (1) a signaling protocol stack between the UE and the CN for connection set-up specifications; and (2) a signaling protocol stack between the UE and the RAN for establishing a radio channel with characteristics consistent with the desired UE-CN service connection.

The initial communications for exchanging signaling protocol messages between the UE and the CN and the UE and the RAN use pre-established common radio resources between the UE and the wireless network. The signaling protocol(s) between the UE and CN are well-established. That between the UE and the RAN, referred to as the Radio Resource Control protocol, has the protocol entity resident at the BSC. In the existing art, both control and data information streams are processed by the BSC.

The BSC controls the radio resources of the BS to establish the radio physical connections, i.e., the radio transceiver characteristics, between the UE and the BS and the ground communications link between the BS and its associated BSC. The BSC employs a signaling protocol with the CN to establish the ground communication link between the BSC and its corresponding entity in the CN. Once all the links are established, the data streams are exchanged between the UE and BS, the BS and the BSC, and the BSC and the CN. The communications between the BS and the BSC and between the BSC and the CN consist of both control and application data information.

The traditional BSC comprises a monolithic and rigid RAN component. It uses fixed dedicated connections with its associated BSs for processing the control signals and the single mode radio access data streams. This limits the wireless service provider's ability to (a) increase the RAN capacity because of the single mode operation limitation, and (b) minimize the impact of BSC outage on wireless service availability, because a fault at the BSC shuts down further communication.

The layered protocol model specific to the traditional single radio access mode is a three-layer structure: the Physical layer (layer 1), the Media Access Control and Radio Link Control layer (layer 2), and the Radio Resource Control (RRC) layer (layer 3). Each of these layers employs technology dedicated to the same specific single radio access mode.

Various methods to implement multiple radio access mode communication, such as using IEEE 802.11 and 3G UMTS and their variants, have been proposed or implemented. [e.g. IEEE Standards 802.11b, a, g, n (http://standards.ieee.org); 3rd Generation Partnership Project, 3GPP, *Technical Specifications and Technical Reports for a 3rd Generation Mobile System* (www.3gpp.org); 3GPP TR 22.934, "*Feasibility Study on 3GPP System to Wireless Local Area Network (WLAN) Interworking*"]. The focus has been on inter-working the radio link modes constituting separate Radio Access Networks (RANs), using one of two schemes that vary in the degree of control and interactions between the networks: Loose Coupling and Tight Coupling. The choice of the coupling scheme has a direct effect on the service performance in the case where the mobile users are handed off from one radio access mode to the other [R. Samarasinghe, V. Friderikos, A. H. Aghavami "Analysis of Intersystem Handover: UMTS FDD & WLAN", London Communications Symposium, 8-9 Sep., 2003].

An example of a RAN architecture that aims to mitigate issues related to integrated BSC functionality in the UMTS Terrestrial RAN (UTRAN) has been described by Siemens. [3GPP TSG-RAN WG3 Meeting #36, "*Proposed Architecture for UTRAN Evolution*," Marne-la-Vallee, 19-23 May 2003.] While decomposing the functionality of a Radio Network Controller (RNC) into two entities—a signaling entity and a data processing entity (DPE), the scheme fails to provide the instant invention's distributed architecture for multimode functionality. (The RNC is the equivalent of the BSC in the 3GPP UMTS standards.) Although the DPEs are inter-linked, each BS has a fixed connection with a specific DPE, which processes both the signaling traffic and the data traffic between them. Consequently, this scheme too suffers from the low network outage tolerance limitation of the other prior art. A fault at the DPE renders the network inaccessible, and further communication impossible.

The prior art schemes employing fixed connections between the BS and the BSC also suffer from less than optimal handoff of mobile UE equipment from one BSC to another. If the new BS lacks a connection with the currently used BSC, the UE connection must be switched to a BSC connected to the new BS. This requires the connection between the BSC and the core network (CN) to be altered, resulting in a less efficient handoff. Because the DPEs are inter-linked in the Siemens approach, however, changing the connection to the CN may be avoided by transferring the data traffic directly from the old to the new DPE. Although more desirable than the alternative, this process incurs traffic delays while also requiring increased infrastructure bandwidth.

Current wireless network deployments handle two types of traffic, the circuit-switched (CS) traffic and the packet-switched (PS) traffic. The former refers to the mobile voice telephony service that ties into the legacy telephony network. The latter corresponds to the mobile access to data networks, such as the Internet. The CS and PS traffic flows are handled separately in the Core Network (CN) by different equipment, comprising the CS and PS domains. A current thrust in wireless technology is to support CS services within the PS domain, eliminating the need for the CS domain. This way, the PS data traffic will support multi-media services, including voice and video. As an intermediate step, the CS domain has witnessed major changes, including use of packet-based connection links between the RAN and the CS domain equipment. This has resulted in separate traffic flows for system signaling and user traffic, consistent with the PS domain's requirements. Where the CS Domain is implemented using such a paradigm, the instant invention is readily applicable to both the PS and CS domains, including multimedia data streams comprising voice and video.

BRIEF SUMMARY OF THE INVENTION

The present invention integrates, as opposed to inter-work, the multimode radio access schemes through a multimode RAN for optimal radio access to the mobile user. It simplifies and streamlines the control required to handoff mobile users from one radio access mode to another. It also improves performance by increasing the speed of the handoff, thereby also increasing the processing speed of the user's applications.

A RAN with a multiple radio access mode capability, i.e. a multimode RAN, presents a significant economical advantage to the service provider, since, in addition to the traditional single mode service, multiple services can be made available with the same common RAN infrastructure. The network architecture disclosed herein achieves this by separating the control signals from the data streams for their distributed processing. Data streams include application data as well as multimedia signals, such as voice and video. Among the multimode RAN's significant advantages are increased outage tolerance for unimpeded communication and increased infrastructure scalability for wider coverage and increased data traffic capacity.

For instance, if the component managing the control signals remains unaffected while a component handling the data streams suffers an outage, the data streams can be directed for continued processing to other data stream handling components that remain operational. Also, by separating the control signal function from that of handling the data stream, the system's data processing capacity can be increased through providing increased parallel oversight by the same control signal managing component over a larger number of data stream processing components.

The data processing entities of the instant invention (referred to herein as Wireless Access Gateways, WAGs) are not linked. Instead, the resources and connectivity of the multiple WAGs in the multimode RAN of the instant invention are managed by a single signaling entity, described herein as a Radio Resource Server (RRS). A key distinction between the instant invention and the prior art resides in the interface between the decomposed entities and the base station. The instant invention uniquely splits this interface into: (a) signaling path between the BS and the RRS; and (b) a data path between the BS and the WAG. This allows the RRS to connect the BS with the most suitable WAG for data transmission. It also allows rapid RAN reconfiguration in the event of failure of a given WAG, even as it dynamically allocates BS and WAG resources. Because the RRS controls all of the BSs and WAGs, handoff of the mobile UE between base stations is efficient.

In an alternative embodiment of the present invention, multiple RRS can be interlinked for even wider coverage and increased data traffic capacity.

An object of the present invention is to provide a RAN that tightly integrates within a unified infrastructure the processing of multiple radio access modes.

Another object of the present invention is to provide a network architecture that separates the control signals from the data streams to allow for their distributed processing.

Yet another object of the present invention is to provide a RAN integrated within a unified infrastructure in which the control signals and data streams are distributed and separately processed.

A further object of the present invention is to provide a RAN that is more outage tolerant than the 2G and 3G architectures currently deployed or under development.

An additional object of the present invention is to provide a RAN that is more cost effectively scaled for wider coverage and increased wireless data traffic capacity.

A still further object of the present invention is to provide a RAN that provides more efficient handoff of mobile user equipment from one base station to another or from one mode to another.

The preferred embodiment of the RAN of the present invention is described using the accompanying drawings. The drawings, however, are primarily for illustration and must not to be construed as limiting. The scope of the invention is to be limited only by the claims, and not by the drawings or description herein.

BRIEF DESCRIPTION OF THE SEVERAL VIEWS OF THE DRAWING

The objects, features, and attendant advantages of the present invention are more fully understood when considered in conjunction with the accompanying drawings.

DETAILED DESCRIPTION OF THE INVENTION

The multimode wireless radio access network of the present invention, multimode RAN, represents a novel and advanced system uniquely suited to wireless communication.

The RAN is compliant with established air interface standards, and can be operated as a wireless local area network (WLAN), a subsystem of a wireless wide area network (WWAN), or a subsystem of an integrated WWAN/WLAN network. It tightly integrates within its architecture the processing of multiple radio access modes. The tight integration (or equivalent tight coupling) refers to the integration architecture in which the RAN enables UE session handover between two or more radio interfaces (or equivalent modes)

without data loss and interruption of the session(s). The result is a wireless communication system that is scalable for cost-effective handling of increased data traffic and substantially more immune to breakdown in service.

Figure 1:
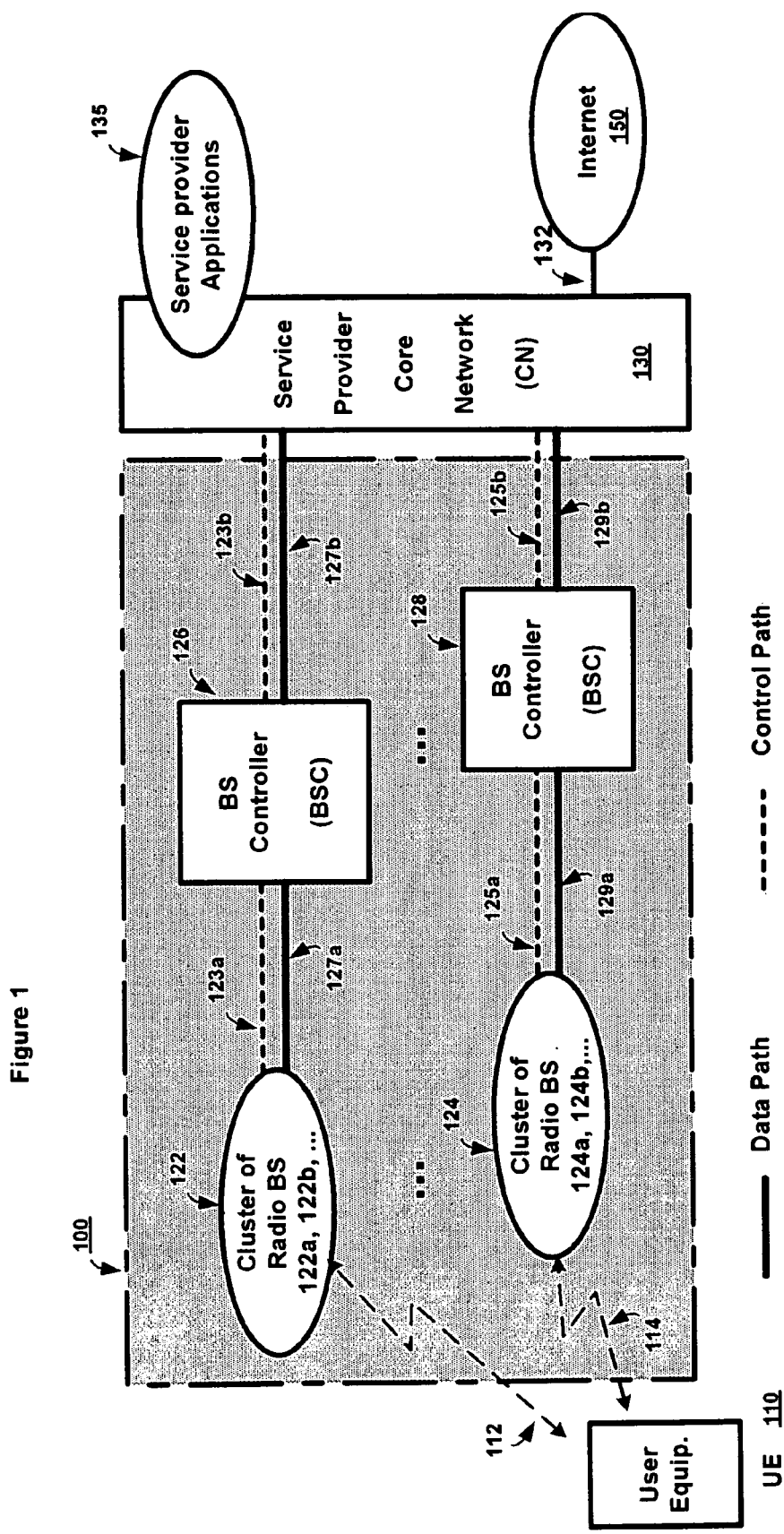
FIG. 1 presents a schematic description of the traditional wireless network architecture.

FIG. 1 presents a schematic diagram of the traditional single radio access mode wireless communication network. Its components include: mobile user equipment (UE) 110; single mode Radio Access Network (RAN) 100; Core Network (CN) 130; connections 132 to applications from other private or public networks, e.g. internet, 150 or those from the service provider 135. The traditional RAN comprises the base station and the Base Station Controller.

The RAN 100 has a number of Base Station Controllers (BSC) 126, 128 and so forth. The BSC 126, for example, manages and controls the resources of multiple base stations (BS), e.g. 122a, 122b etc., comprising a cluster of BS's 122. Other BSCs, for example BSC 128, similarly manage and control the resources of their associated BSs, e.g. BSs 124a, 124b and so forth, comprising a separate cluster, e.g. cluster 124. The mobile user equipment 110 communicates with the various base stations, e.g. 122a, 122b, 124a, 124b and so forth, using available wireless interfaces 112, 114 and so forth. Although the traditional RAN has many BSCs with their BSs arranged in associated clusters, FIG. 1, for simplicity, limits itself to two of each as examples.

The communications between the BSs, e.g. 122a, 124a, BSCs, e.g. 126, 128, and CN 130 appear as straight dotted lines (e.g. 123a, 123b, 125a, 125b) and straight solid lines (e.g. 127a, 127b, 129a, 129b) in FIG. 1. The dotted lines (e.g. 123a, 123b, 125a, 125b) represent the transmission of control signals with which the radio resources are managed by the BSCs, and the solid lines (e.g. 127a, 127b, 129a, 129b) that of the application data streams of principal interest to the mobile user.

Figure 2:
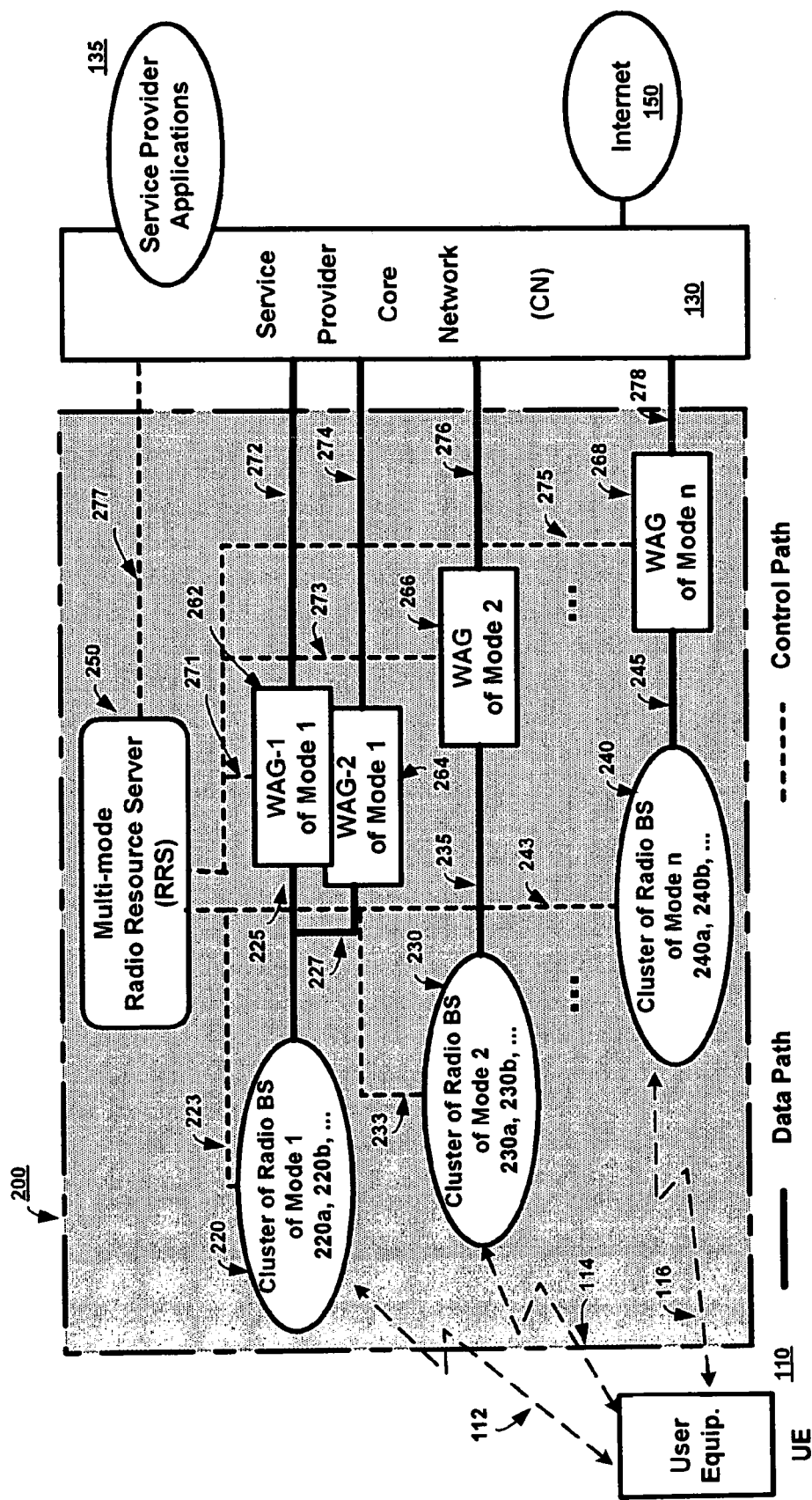
FIG. 2 depicts the block diagram of the multimode RAN of the present invention.

FIG. 2 depicts the block diagram of the multimode RAN 200 of the present invention. In this preferred embodiment of the present invention, the traditional wireless communications network architecture remains the same, except for the multimode RAN 200 that employs a distributed functionality of the traditional BSC in the single mode RAN. For example, the functionality of the BSC 126 or 128 in FIG. 1 is now distributed into two main components: the Radio Resource Server (RRS) 250 that handles the control signals, e.g. 223, 233, 243, 271, 273, 275, and the Wireless Access Gateways (WAGs), e.g. 262, 264, 266, 268, handling the data streams, e.g. 225, 227, 235, 245. The data streams include application data as well as multimedia signals, such as voice and video. Thus, the new multimode RAN solution is based on the separate processing of the control signals, 223 etc. and data streams, 225 etc., both of which are traditionally performed by the same BSC in the existing art. The RRS controls and manages the radio resources for the base station and the WAG, and maintains the signal connections of the RAN with the Core Network (CN). The WAG controls the data traffic between the base station and the Core Network (CN).

As before, the base stations are arranged in clusters, e.g. 220, 230, 240, representing the same or different radio access modes, 1, 2 . . . n, with which the UE 110 is in communication. While FIG. 1 showed two clusters of a single radio access mode, FIG. 2 indicates clusters 220, 230, 240 with modes ranging from 1 through an arbitrary number "n," the BSs of each cluster operating with a radio access mode that may be the same or different as for the BS's of another cluster. The control signals appearing as dotted lines e.g. 223 233, 243, between the BSs in clusters 220 etc. and the RRS 250, are transmitted separately from the data streams e.g. 225, 227, 235, 245. The RRS 250 provides control signals, e.g. 223, to the selected BSs, e.g. 220a, in the clusters, e.g. 220, for dynamic resource allocation and data transmission, said data transmissions appearing in FIG. 2 as solid lines, e.g. 225, 227, 235, 245.

The RRS 250 handles the control and signaling aspects of the traditional BSC 126, including: (a) the management of the radio interface resources; e.g., radio channel assignment, radio power control, etc; (b) the management of the BS's (e.g. 220a) resources and its RAN 200 connections; and (c) the allocation of the WAG's, e.g. 262, resources and connectivity to the core network 130. The RRS 250 operates across multiple radio modes, and assigns the multimode RAN's 200 resources best fitting the radio conditions for a given mobile user, including switching a multimode capable mobile user equipment 110 from one radio mode to another.

The WAG, e.g. 262, handles the data stream from and to the BS e.g. 220a, and CN 130, bridging the two main sub-networks of the service provider's infrastructure, the RAN 200 and CN 130. Preferably, each WAG, e.g. 262, is logically specialized for a given radio mode, with its resources and configuration being fully controlled by the RRS, 250. Thus, the WAG, e.g. 268, of a given radio mode "i" (Mode i=1, 2, . . . , n) connects to a BS 240a or a cluster of BS's, e.g. 240, of the same radio mode i (FIG. 2). Alternative implementations, including multiple logical specializations of the WAG, e.g. 262, are possible and within the scope of this invention.

The signaling stacks at the UE 110 remain unchanged, even as the Radio Resource Control (RRC) protocol and all associated functions are processed at the RRS 250. Similarly, without any change in the signaling stacks at the BS, e.g. 220a, 220b etc., and CN 130, the signaling protocols governing the previous BSC-BS and the BSC-CN connections are now relegated to the new RRS 250 entity. In addition, a protocol stack is devised for the RRS-WAG that enables full control of the RRS 250 over the WAGs', e.g. 262, resources.

The application data streams routed in the prior art from and to the BSC e.g. 126, are now routed via the WAG, e.g. 262. After the UE 110-CN 130 service connection specifications are established, the UE 110-RRS 250 signaling protocol designates the UE 110 radio channel resources commensurate with those UE-CN connection specifications.

Concurrent with its radio resource signaling with the UE 110, the RRS 250 uses the RRS 250-BS, e.g. 220a, and RRS 250-WAG, e.g. 262, signaling protocols to establish (a) the radio channel resources at the BS, e.g. 220a, and the WAG, e.g. 262, corresponding to the UE 110 radio channel resources, and (b) the BS, e.g. 220a,-WAG, e.g. 262, ground communications link for the transport of application data, e.g. 225. The RRS 250 also uses its signaling protocol 277 with the corresponding CN 130 entity to establish the ground communication link for transporting the application data, e.g. 272, between the WAG, e.g. 262, and the CN 130.

Inherent to the distributed multimode RAN, e.g. 200, architecture of the present invention, a given cluster of BS's e.g. 220, can be flexibly and dynamically connected to more than one WAG, e.g. 262, 264, of the same mode. (FIG. 2) This enhances the RAN 200 capability in three major aspects: (a) system resilience to WAG outages; (b) improved system scalability with the ease of introducing additional data processing capacity when required; and (c) better use of processing resources by traffic load balancing among the multiple WAGs.

Besides achieving the hitherto unavailable tight integration of wireless communication networks across multiple radio access modes through the multimode RAN 200, the distributed processing scheme also considerably improves the performance of the traditional single mode RAN. The separation of the control signals from the data streams at the base station level enhances the single mode network's outage tolerance and infrastructure scalability, while providing a more reliable and efficient network architecture. The single mode RAN utilizing distributed processing comprises a special case of the multimode RAN 200, where the base station, RRS, and WAG, all operate with the same single radio access mode. The single mode RAN is, thus, within the scope of the present invention.

Figure 3:
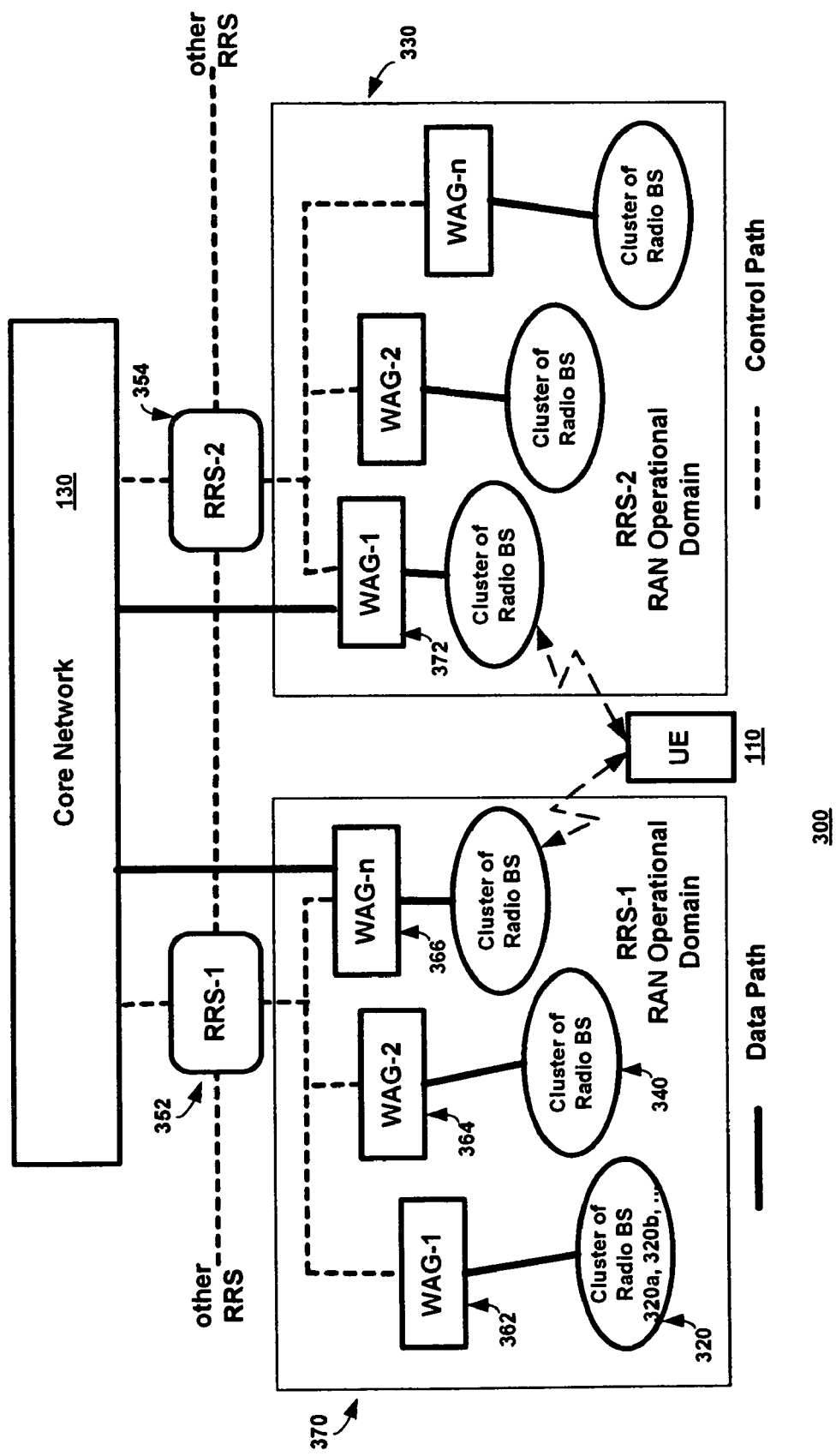
FIG. 3 shows a distributed RAN deployment employing multiple Radio Resource Servers (RRS)

FIG. 3 shows an alternative embodiment of the multimode RAN 300. It includes multiple RRS units, e.g. 352, 354 etc., where each RRS, e.g. 352, controls its own set of clusters, e.g. 320, 340 etc., of base stations e.g. 320*a*, 320*b* etc., and WAGs, e.g. 362, 364, 366 etc. Each such grouping is designated herein as a RRS-RAN Operational Domain (ROD), e.g. 330, 370 etc. A mobile user 110 can transition from one RRS ROD 370 to another RRS ROD 330 using an inter-RRS signaling protocol for transferring mobile user connectivity information from the current serving RRS, e.g. 352, to the new RRS, e.g. 354. This protocol interoperates with the signaling protocols between the CN 130 and the individual RRS's, e.g. 352, while also coordinating the data flow handoff between the current WAG, e.g. 366, under the control of the current serving RRS 352, and the new WAG, e.g. 372 designated and controlled by the new RRS 354.

Figure 4:
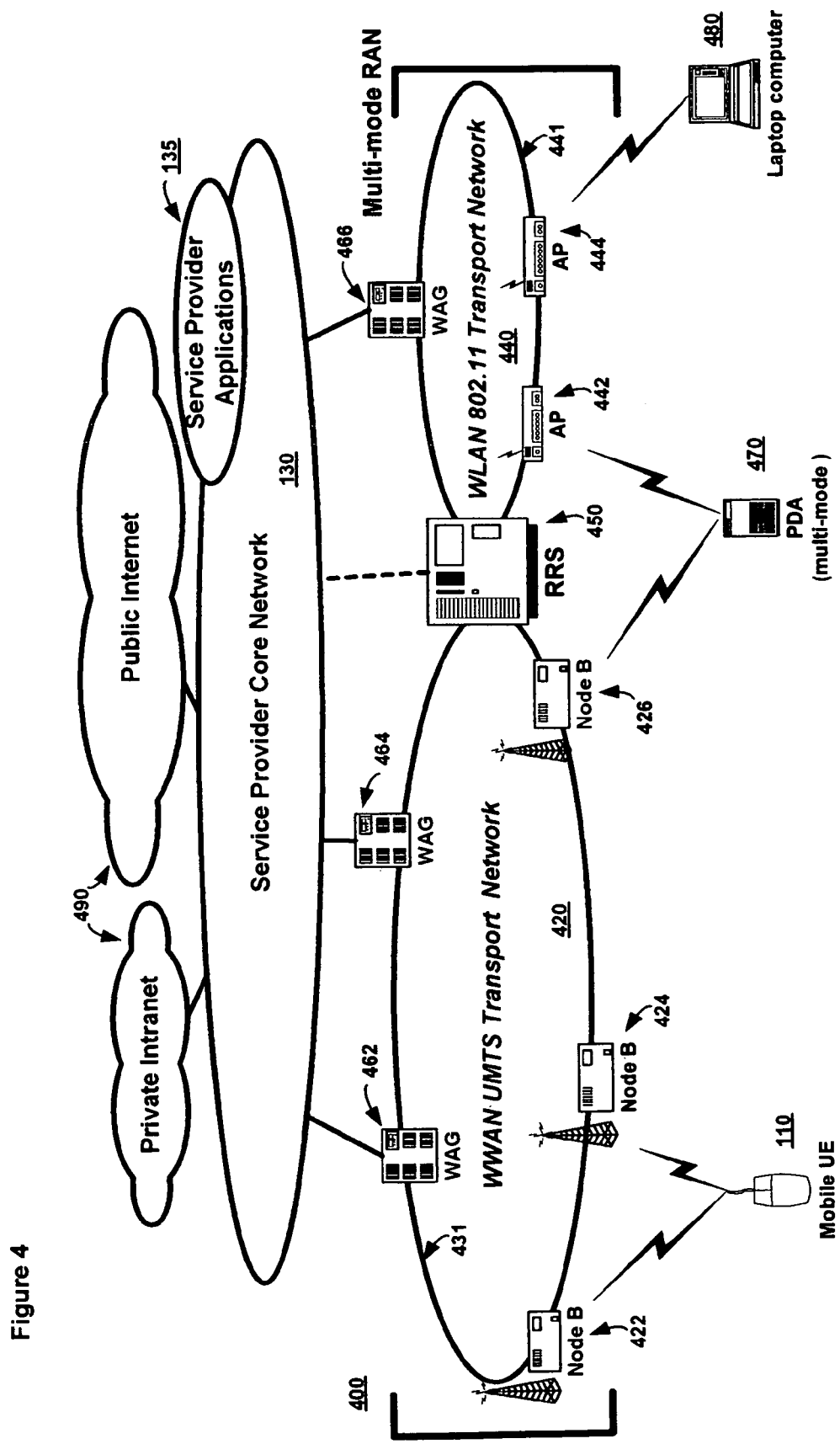
FIG. 4 depicts an exemplary wireless service network infrastructure based on the present invention.

FIG. 4 presents one example of how the multimode RAN 400 of the present invention can integrate, within a unified wireless infrastructure, two service networks: a wireless wide area network (WWAN), viz. the 3G UMTS radio access mode and its variants 420; and a wireless local area network (WLAN), viz. the IEEE 802.11 (or 802.16) radio access mode and its variants 440. This selection of radio modes is made because the typical IEEE 802.11 (or 802.16) deployment 440 is best operated in a short distance wireless local area network (WLAN); whereas, the UMTS network 420 is designed to support a wireless wide area network (WWAN). These systems are considered complementary, and promising candidates for an integrated multimode RAN 400.

FIG. 4 is only intended to be exemplary and imposes no limitations on the multimode RAN herein, which is applicable, without any restrictions, to any radio access mode that benefits from the concept of an integrated radio access network system. Other integration schemes obvious to one of ordinary skill in the art are within the scope of the instant disclosure.

In the RAN 400 of FIG. 4, multiple UMTS base stations (known as Node B) 422, 424, 426 can be dynamically connected to multiple UMTS WAG nodes, e.g. 462, 464 via deployed WWAN transport network e.g. 431. In a similar manner, the IEEE 802.11 base stations (know as Access Points, APs), e.g. 442, 444, can be dynamically connected to an IEEE 802.11 WAG node e.g. 466, via WLAN transport network e.g. 441. All of these RAN elements are controlled by a common RRS 450, which also maintains a signaling connection with a CN 130 entity. This RRS 450-CN 130 signaling connection is used to dynamically establish the WAG e.g. 466-CN 130 connections bearing the data traffic.

The integrated wireless system 400 connects the UE 110, or mobile user's, e.g. 470, 480, applications via the nodes e.g. 422, 442, to the service provider's applications 135 or applications available via attached private or public networks, e.g. 490. The wireless communications service in FIG. 4 may be provided to three types of mobile nodes: (1) UMTS (WWAN) only mobile node e.g. 110; (2) IEEE 802.11 or 802.16 (WLAN) only mobile node e.g. 480; and (3) combined UMTS (WWAN) and IEEE 802.11 or 802.16 (WLAN) mobile nodes e.g. 470.

For the first and second type of mobile nodes, it is intended for the RRS 450 to be able to command a mobile node switchover between two radio base stations e.g. 422, 424 or 442, 444 of the same type of radio modes. As for the third type of mobile nodes, it is intended for the RRS to be able to command a mobile node switchover between the two available radio modes. The switchover decision will be based on specialized switchover algorithms and established signaling protocols resident in both the mobile node, e.g. 470, and the RRS 450 node.

Figure 5:
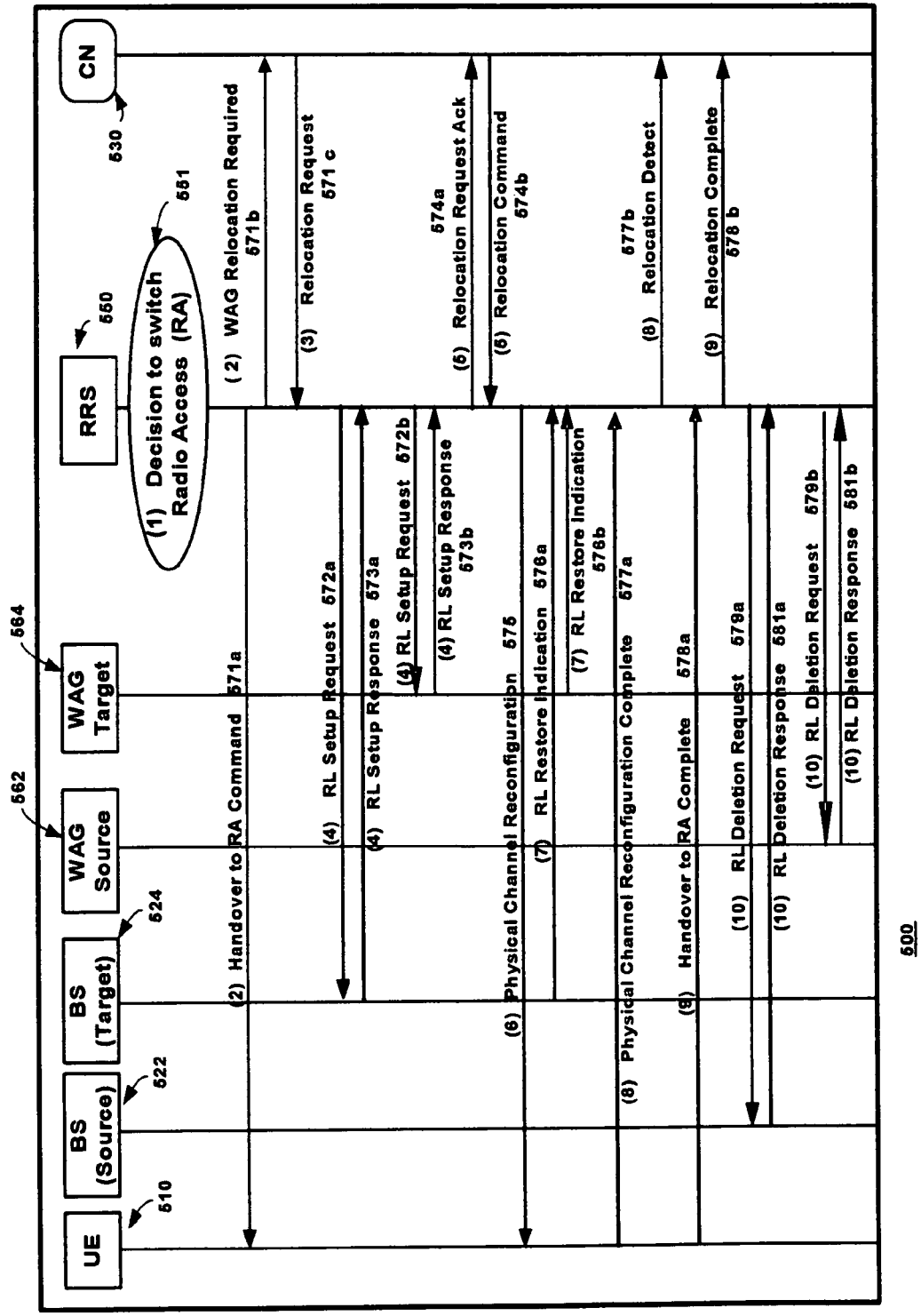
FIG. 5 presents a sample procedure to handover a mobile UE between two different radio access modes.

FIG. 5 and the stepwise procedure below describe a sample handover of a mobile UE 510 between two different radio access modes. The procedure described is only intended to be exemplary, and should not be construed as a limitation on what is claimed. The radio access mode specific equipment are labeled "BS-Source" 522 and "WAG-Source" 562 for the radio access mode from which the mobile UE 510 is switching, and "BS-Target" 524 and "WAG-Target" 564 for the radio access mode to which the mobile UE 510 is switching. The CN label below incorporates all the respective required functional entities in the customary Core Network (CN), without specifying the particular CN entity acting on a message.

(1) The handover procedure, which is based on the RRC protocol defined for UMTS, starts once the RRS 550 decides to handover the mobile UE 510 from one access mode to another 551. This decision is based on the quality of the radio signals transmitted and/or received by the UE 510. The RRS 550 selects the WAG-Target 564, optimal for the target base station, BS-Target 524, and (a) informs the CN 530 of the new WAG 564 connection; (b) establishes the required resources at the BS-Target 524 and the WAG-Target 564; and (c) commands the mobile UE 510 to commit the radio resources for the new access mode.

(2) The procedure is initiated with the RRS 550 alerting the UE 510 that a handover is in process by sending it a "Handover to RA Command" 571*a* per the established Radio Resource Control (RRC) protocol using the signaling link existing over the current access mode. This is followed by sending the CN 530 a "WAG Relocation Required" message 571*b*.

(3) The CN 530, in turn, responds with a "Relocation Request" 571*c* message to RRS 550 to allocate resources for WAG relocation, as the CN 530 prepares for relocating the connection from the WAG-Source 562 to the WAG-Target 564.

(4) The RRS 550 commands both the BS-Target 524 and WAG-Target 564 to allocate RAN resources for the new connection by sending "RL Setup Request" to both entities 572*a*, 572*b*. Once the resources are established, "RL Setup Response" messages 573*a*, 573*b* are received respectively from the BS-Target 524 and WAG-Target 564, as they commence the pre-established transmit and receive synchronization process pertinent to the new access mode. The RAN 200 resource allocation scheme may vary with the access mode used.

(5) Upon completion of allocation of the required radio resources, the RRS 550 informs the CN 530 by sending a "Relocation Request Acknowledge" message 574*a*. When the CN 530 is ready for the WAG connection relocation, it commands the relocation with a "Relocation Command message 574*b* to RRS 550.

(6) The RRS 550 then commands the mobile UE 510 to commit the radio resources associated with the new radio access scheme by sending it a "Physical Channel Reconfiguration" message 575 with the specific parameters required for the UE 510 to establish radio connection with the established BS-Target 524. The UE 510 commences the pre-established transmit and receive synchronization process pertinent to the new radio access mode.

(7) Once the initial radio connections are established between the mobile UE 510 and the BS-Target 524 and WAG-Target 564, both these latter entities inform the RRS 550 by issuing it a "RL Restore Indication" message 576*a*, 576*b*. This indication of radio connection restoration may vary per the radio access mode used.

(8) Per the established RRC protocol between the RRS 550 and the UE 510, the RRS 550 expects to receive from the mobile UE 510 the RRC message "Physical Channel Reconfiguration Complete" 577*a* on the signaling link between the UE 510 and the RRS 550 that is established now on the new access mode. Once received, the RRS 550 informs the CN 530, with a "Relocation Detect" message 577*b*, to expect data exchange with the UE 510 via the new WAG-Target 564.

(9) Once the UE 510 and CN 530 data connection are established, e.g., data connection service is resumed following the handover, the mobile UE 510 informs the RRS 550 of such event by sending it the RRC "Handover to RA Complete" message 578*a*. In turns, the RRS 550 indicates to the CN 530, by sending the "Relocation Complete" message 578*b*, that the multimode RAN 200 side of the connection relocation is now complete and that the RAN 200 resources of the previous radio access mode will be released. (At all times before the "Relocation Complete" 578*b* message is sent, the previous communication link between the CN 530 and UE 510 remains intact and execution of this procedure can be cancelled and the original configuration readily restored.)

(10) The RRS 550 then releases the RAN 200 resources used for the previous access mode at BS-Source 522 and WAG-Source 562 using a series of specific "RL Deletion Request" messages 579*a*, 579*b* and acknowledged by "RL Deletion Response" messages 581*a*, 581*b*. The release of RAN 200 resources may vary per the radio access mode used. Also, for a specific access mode, the RRS 550 may not be required to have a direct signaling link to the BS-Source, e.g. 522. In that event, the RAN 200 resources release could be achieved via the WAG-Source, e.g. 562.

We claim:

1. A multimode wireless radio access network (RAN) system for accessing other communication networks comprising:
    at least two base stations, with each base station operating at one radio mode of a plurality of radio modes;
    at least one Wireless Access Gateway (WAG) not connected to or communicating with any other WAG, wherein each base station communicates with at least one WAG;
    a Radio Resource Server (RRS) operating over said plurality of radio modes and in communication with each said base station and each said WAG; and
    a network architecture for establishing a signaling path between each said base station and said RRS, a signaling path between each said WAG and said RRS, and a data path between each said base station and its connected WAGs;
    wherein said RRS provides control signals along said signaling paths for data transmission along said data path and for managing and dynamically assigning the connectivity and radio resources of all said base stations and WAGs and any user equipment communicating via said base stations.

2. The system of claim 1, wherein each RRS is in communication with at least one other RRS.

3. The system of claim 1, wherein the RRS manages the base station's control signals and data streams.

4. The system of claim 3, wherein data streams includes multimedia signals.

5. The system of claim 1, wherein the RRS manages at least one WAG's resources and connectivity to other communication networks.

6. The system of claim 3, wherein each WAG transmits data streams of a single mode between at least one base station and other communication networks.

7. The system of claim 3, wherein the WAG operates in the same radio mode as the base station.

8. The system of claim 1, wherein other communication networks includes a wireless wide area network (WWAN).

9. The system of claim 8, wherein WWAN includes UMTS.

10. The system of claim 8, wherein WWAN includes CDMA2000.

11. The system of claim 1, wherein other communication networks includes a wireless local area network (WLAN).

12. The system of claim 11, wherein WLAN includes IEEE802.11.

13. The system of claim 11, wherein WLAN includes IEEE802.16.

14. The system of claim 1, wherein at least one base station is in simultaneous communication with at least two Wireless Access Gateways WAGs.

15. A multimode wireless radio access network (RAN) system for accessing other communication networks comprising:
    at least two Radio Resource Servers (RRS), wherein each RRS operates over a plurality of radio modes and wherein the RRSs are linked and communicate with each other; each RRS having within its RRS-RAN Operational Domain (RRS ROD);
    at least two base stations, each base station operating at one radio mode of the plurality of RRS radio modes, and at least one Wireless Access Gateway (WAG) not connected to or communicating with any other WAG, each base station in each RRS ROD communicates with at least one WAG in the same RRS ROD;
    a network architecture for establishing within each RRS ROD a signaling path between each base station and a RRS, a signaling path between each WAG and a RRS, and a data path between each base station and its connected WAGs, wherein each said RRS provides within its RRS ROD control signals along said signaling paths for data transmission along said data paths and for managing and dynamically assigning the connectivity and radio resources of its base stations and WAGs and any user equipment (UE) communicating via the base stations; and
    an inter-RRS signaling protocol for transferring UE connectivity from the base station and WAG of a first RRS ROD to the base station and WAG of a second RRS ROD.

16. The system of claim 15, wherein each RRS is in communication with at least one WAG.

17. The system of claim 16, wherein each RRS manages the WAG's connectivity to other communication networks.

18. The system of claim 17, wherein each WAG transmits data streams of a single mode between at least one base station and other communication networks.

19. The system of claim 15, wherein the RRS manages within its RRS ROD the base station's control signals and data streams.

20. The system of claim 19, wherein data streams includes multimedia signals.

21. The system of claim 19, wherein the WAG operates in the same radio mode as the base station.

22. The system of claim 15, wherein other communication networks include a wireless wide area network (WWAN).

23. The system of claim 22, wherein WWAN includes UMTS.

24. The system of claim 22, wherein WWAN includes CDMA2000.

25. The system of claim 15, wherein other communication network includes a wireless local area network (WLAN).

26. The system of claim 25, wherein WLAN includes IEEE802.11.

27. The system of claim 25, wherein WLAN includes IEEE802.16.

28. The system of claim 15, wherein at least one base station is in simultaneous communication with at least two WAGs in the same RRS ROD.

29. A multimode wireless radio access network (RAN) system comprising:
    at least two base stations with each base station operating at one radio mode of a plurality of radio modes, and at least one Wireless Access Gateway (WAG);
    means for providing control signals in a multimode base station and WAG resource pool for data transmission, said multimode resource pool managed by a single Radio Resource Server (RRS) operating over said plurality of radio modes;
    means for managing and dynamically assigning the connectivity and radio resources of said base stations and Wireless Access Gateways and any user equipment communicating via said base stations; and
    means for distributing the processing of each base station's control signals and data streams for communicating with other wireless communication networks.

30. The system of claim 29, wherein data streams includes multimedia signals.

31. The system of claim 29, wherein other communication network is a wireless wide area network (WWAN).

32. The system of claim 31, wherein WWAN includes UMTS.

33. The system of claim 31, wherein WWAN includes CDMA2000.

34. The system of claim 29, wherein other communication network is a wireless local area network (WLAN).

35. The system of claim 34, wherein WLAN includes IEEE802.11.

36. The system of claim 34, wherein WLAN includes IEEE802.16.

37. A method for multimode wireless radio access comprising the steps of:
    separating the control signals from the data streams for at least two base stations, wherein each base station operates at one radio mode of a plurality of radio modes;
    establishing a signaling path between each said base station and a Radio Resource Server (RRS) that operates over said plurality of radio modes, a signaling path between each Wireless Access Gateway (WAG) and the RRS, and a data path between each base station and its connected WAGs;
    communicating control signals along said signaling paths for data transmission along said data paths and for managing and dynamically assigning the connectivity and radio resources of said base stations and said WAGs and any user equipment (UE) communicating via said base stations;
    managing and dynamically assigning, using the multimode RRS, the connectivity and radio resources of each base station, the WAG, and any user equipment communicating via the base station;
    transmitting the data streams along said data paths; and
    processing said data streams at the WAG and said control signals at the RRS for wireless communications with other communication networks.

38. The method of claim 37, wherein the RRS manages the base station's control signals and data streams.

39. The method of claim 37, wherein the RRS manages at least one WAG's connectivity to other communication networks.

40. The method of claim 37, wherein each WAG transfers data streams of a single mode for at least one base station.

41. The method of claim 37, wherein each WAG operates at a selected radio mode.

42. The method of claim 37, wherein data streams includes multimedia signals.

43. The method of claim 37, wherein other communication networks includes a wireless wide area network (WWAN).

44. The method of claim 43, wherein WWAN includes UMTS.

45. The method of claim 43, wherein WWAN includes CDMA 2000.

46. The method of claim 37, wherein other communication networks includes a wireless local area network (WLAN).

47. The method of claim 46, wherein WLAN includes IEEE802.11.

48. The method of claim 46, wherein WLAN includes IEEE802.16.

49. A method for wireless radio access across multiple multimode Radio Resource Server RRS-RAN Operational Domains (RRS RODs) comprising the steps of:
    linking multiple multimode Radio Resource Servers RRSs with each other;
    separating, within a first and a second RRS ROD, the control signals from the data streams for at least two base stations, wherein each base station operates at one of a plurality of radio modes;
    establishing, within each of said first RRS ROD and said second RRS ROD, a signaling path between the Radio Resource Server (RRS) that operates over said plurality of radio modes and each base station, a signaling path between said RRS and each Wireless Access Gateway (WAG), and a data path between each said base station and its connected WAGs;
    communicating within each said first RRS ROD and second RSS ROD control signals along said signaling paths between each said base station and said RRS and between each said WAG and said RRS for data transmission along said data paths and for managing and dynamically assigning the connectivity and radio resources of said base stations and said WAGs and user equipment (UE) communicating via said base stations; and
    transferring the mobile UE connectivity from a base station and a WAG of said first RRS ROD to a base station and a WAG of said second RRS ROD using an inter-RRS signal protocol.

50. The method of claim 49, wherein data streams includes multimedia signals.

51. A method of handover of user equipment from one radio access mode to another comprising the steps of:
    detecting and deciding, by a Radio Resource Server (RRS), to switch from a first radio access mode at a source Base Station to a second radio access mode at a target Base Station based on signals at the user equipment (UE) transmitted from the UE to the RRS;

alerting the UE, by the RRS, that a handover is in process from the first radio access mode to the second radio access mode;

selecting, by the RRS, a target Wireless Access Gateway (WAG) for the target Base Station;

communicating to the core network (CN), by the RRS, that WAG relocation is required from the source WAG operating in the first radio access mode of the source Base Station to the target WAG operating in the second radio access mode;

establishing, by the RRS, the readiness for the target WAG connection;

commanding the user equipment, by the RRS, to commit radio resources for the second radio access mode connection with the target Base Station;

establishing a radio connection between the UE and the target Base Station;

providing a notice to the RRS of a connection establishment by the target Base Station and the target WAG; and resuming a data connection service between the user equipment and the core network via the target Base Station and the target WAG.

52. The method of claim 51, wherein selection of a WAG includes RRS control of base station and WAG resources and connectivity and RRS communication with a core network.

53. The method of claim 52, wherein RRS control further includes dynamic allocation of base station and WAG resources.

* * * * *